(12) United States Patent
Matsen et al.

(10) Patent No.: US 10,994,450 B2
(45) Date of Patent: *May 4, 2021

(54) INDUCTION HEATING CELLS WITH CAULS OVER MANDRELS METHODS OF USING THEREOF

(71) Applicant: The Boeing Company, Chicago, IL (US)

(72) Inventors: Marc R. Matsen, Seattle, WA (US); Lee C. Firth, Renton, WA (US); Gregory A. Foltz, San Diego, CA (US); William C. Dykstra, Rockford, MI (US); Jennifer S. Noel, Kent, WA (US)

(73) Assignee: The Boeing Company, Chicago, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/843,596

(22) Filed: Apr. 8, 2020

(65) Prior Publication Data

US 2020/0238578 A1    Jul. 30, 2020

Related U.S. Application Data

(63) Continuation of application No. 15/841,918, filed on Dec. 14, 2017, now Pat. No. 10,654,199.

(51) Int. Cl.
| | | |
|---|---|---|
| *B29C 35/08* | (2006.01) | |
| *B29C 70/46* | (2006.01) | |
| *B29C 70/44* | (2006.01) | |
| *B29C 43/36* | (2006.01) | |
| *B29C 70/34* | (2006.01) | |
| *B29C 33/06* | (2006.01) | |
| *B29D 99/00* | (2010.01) | |

(52) U.S. Cl.
CPC .......... *B29C 35/0805* (2013.01); *B29C 33/06* (2013.01); *B29C 43/3642* (2013.01);
(Continued)

(58) Field of Classification Search
CPC ............ H05B 6/10; H05B 6/06; H05B 6/105
(Continued)

(56) References Cited

U.S. PATENT DOCUMENTS

| 5,683,608 A | 11/1997 | Matsen et al. |
| 10,654,199 B2 | 5/2020 | Matsen et al. |

(Continued)

FOREIGN PATENT DOCUMENTS

EP    2886311 A1    6/2015

OTHER PUBLICATIONS

U.S. Appl. No. 15/841,918, Notice of Allowance and Fees Due (Ptol-85), dated Feb. 20, 2020, 10 pgs.
(Continued)

*Primary Examiner* — Christine J Skubinna
(74) *Attorney, Agent, or Firm* — Kwan & Olynick LLP

(57) ABSTRACT

Disclosed herein are induction heating cells and methods of using these cells for processing. An induction heating cell may be used for processing (e.g., consolidating and/or curing a composite layup having a non-planar portion. The induction heating cell comprises a caul, configured to position over and conform to this non-planar portion. Furthermore, the cell comprises a mandrel, configured to position over the caul and force the caul again the surface of the feature. The CTE of the caul may be closer to the CTE of the composite layup than to the CTE of the mandrel. As such, the caul isolates the composite layup from the dimensional changes of the mandrel, driven by temperature fluctuations. At the same time, the caul may conform to the surface of the mandrel, which can be used to define the shape and transfer pressure to the non-planar portion.

20 Claims, 6 Drawing Sheets

(52) U.S. Cl.
CPC ............ *B29C 70/342* (2013.01); *B29C 70/44* (2013.01); *B29C 70/46* (2013.01); *B29D 99/0014* (2013.01); *B29C 2035/0811* (2013.01); *B29C 2043/3649* (2013.01); *B29K 2905/02* (2013.01); *B29K 2905/12* (2013.01)

(58) Field of Classification Search
USPC .......................................... 219/659; 264/403
See application file for complete search history.

(56) References Cited

U.S. PATENT DOCUMENTS

| | | |
|---|---|---|
| 2015/0013894 A1 | 1/2015 | Matsen et al. |
| 2015/0137427 A1 | 5/2015 | Matsen et al. |
| 2016/0354994 A1 | 12/2016 | Meure et al. |
| 2017/0036310 A1 | 2/2017 | Matsen et al. |
| 2019/0184610 A1 | 6/2019 | Matsen et al. |
| 2019/0191495 A1 | 6/2019 | Matsen et al. |

OTHER PUBLICATIONS

U.S. Appl. No. 15/841,918, Restriction Requirement dated Nov. 29, 2019, 7 pgs.

European Application Serial No. 18209246.0, Search Report dated May 14, 2019, 5 pgs.

Matsen, Marc R.., et al., Induction Heating Cells Comprising Tensioning Members With Non-Magnetic Metal Cores, 37 pgs.

Matsen, Marc R.., et al., Induction Heating Cells with Controllable Thermal Expansion of Bladders and Methods of Using Thereof; 31 pgs.

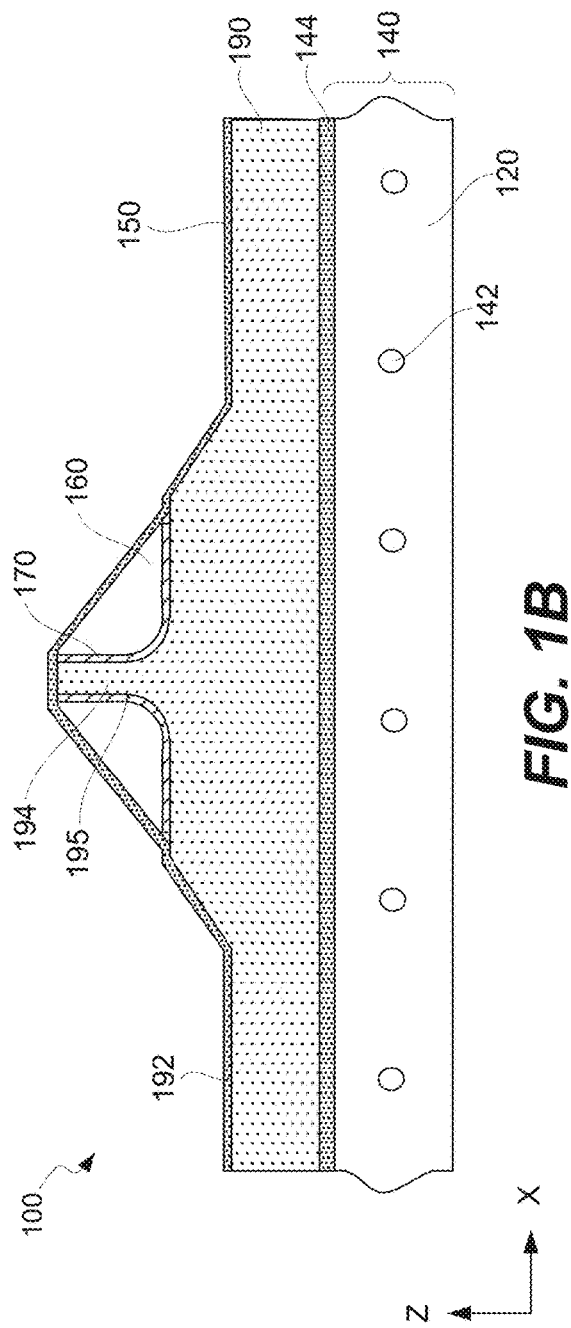
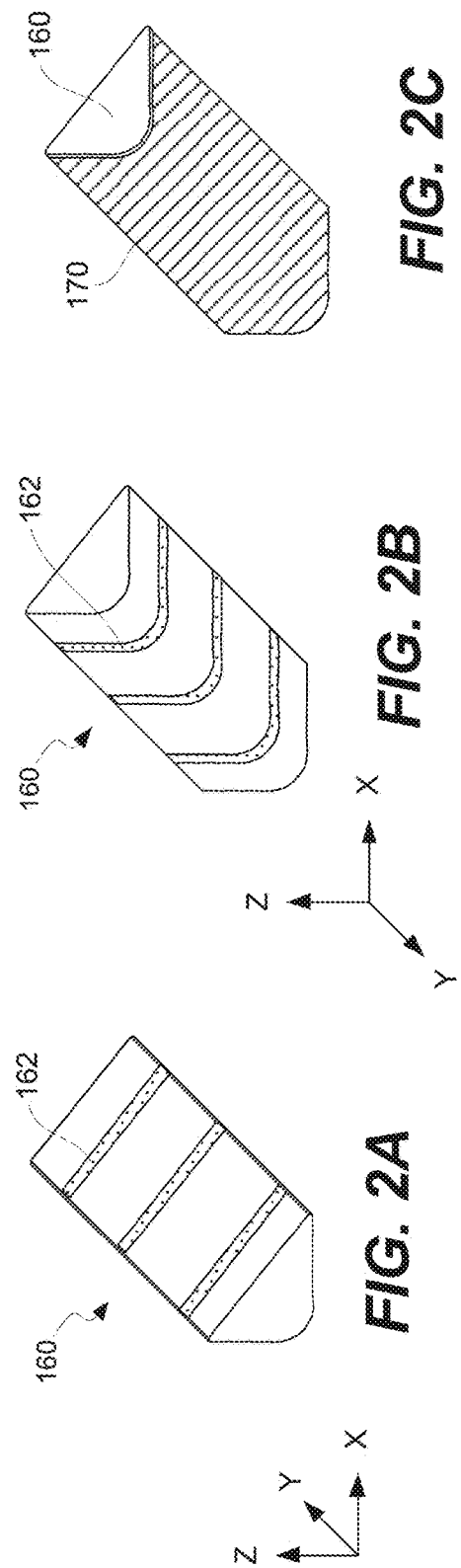

INDUCTION HEATING CELLS WITH CAULS OVER MANDRELS METHODS OF USING THEREOF

CROSS-REFERENCE TO RELATED APPLICATIONS

This application claims is a continuation of U.S. Provisional patent application Ser. No. 15/841,918, entitled: "INDUCTION HEATING CELLS WITH CAULS OVER MANDRELS METHODS OF USING THEREOF", filed on 2017 Dec. 14, which is incorporated herein by reference in its entirety for all purposes.

This invention was made with Government support under DE-EE005780 awarded by Department of Energy. The government has certain rights in this invention.

BACKGROUND

Processing parts having complex shapes can be challenging. For example, applying uniform pressure to consolidate and shape processed parts with non-planar portions may require forces applied in different directions. Specially-shaped mandrels may be used for tight corners and other hard-to-reach places on these surfaces. However, mandrels and processed parts often have very different coefficient of thermal expansions (CTEs). The CTE mismatch complicates processing during heating-cooling cycles. Furthermore, uniform heating of parts with complex shapes can be difficult.

SUMMARY

Disclosed herein are induction heating cells and methods of using these cells for processing. An induction heating cell may be used for processing (e.g., consolidating and/or curing) a composite layup having a non-planar portion. The induction heating cell comprises a caul, configured to position over and conform to this non-planar portion. Furthermore, the cell comprises a mandrel, configured to position over the caul and force the caul against the surface of the feature. The CTE of the caul may be closer to the CTE of the composite layup than to the CTE of the mandrel. As such, the caul isolates the composite layup from the dimensional changes of the mandrel, driven by temperature fluctuations. At the same time, the caul may conform to the surface of the mandrel, which can be used to define the shape and transfer pressure to the non-planar portion.

Provided is a method, which may be used to form a composite part, having complex surface geometry, from a composite layup. The method comprises a step of positioning the composite layup over a die. The composite layup comprises a planar portion and a non-planar portion, extending away from the planar portion in a direction away from the die. In some examples, this direction is perpendicular to the surface of the planar portion.

The method further comprises a step of positioning a caul over the non-planar portion of the composite layup. The caul is configured to conform to the surface of the non-planar portion after this or after a subsequent operation. The method comprises a step of positioning a mandrel over the caul such that the caul is disposed between the mandrel and the non-planar portion. The difference between the coefficient of thermal expansion (CTE) of the caul and the CTE of the composite layup is less than the difference between the CTE of the mandrel and the CTE of the caul. In other words, the CTE of the caul is closer to the CTE of the composite layup than to the CTE of the mandrel. The caul physically isolates the mandrel from the composite part and allows expansion and contraction of the mandrel during thermal cycling without interfering with the composite layup. The composite layup also expands and contracts but less than the mandrel.

The method comprises a step of positioning a bladder over the mandrel and also over the planar portion of the composite layup. The method also comprises a step of heating the composite layup using an induction heater. Furthermore, the method comprises a step of applying pressure onto the mandrel and the planar portion of the composite layup using the bladder.

In some examples, the step of heating the composite layup using the induction heater comprises a step of inductively heating the caul. The caul is heated using the magnetic field generated by the induction heater. The heating of the caul provides localized heating of the non-planar portion of the composite layup, which is thermally coupled to the caul but may be further away from a heating component of the induction heater, such as a susceptor. In some examples, the caul directly interfaces the non-planar portion of the composite layup.

In some examples, the step of heating the composite layup using the induction heater comprising a step of inductively heating a susceptor of the induction heater. The susceptor is heated using the magnetic field generated by the induction heater. The same magnetic field may be used for heating the caul The composite layup is, for example, disposed between the susceptor and the caul, both of which are heated and then transfer hear to the composite layup from different sides. The composite layup may be at least partially permeable to the magnetic field generated by the induction heater. This allows allowing the magnetic field to reach the caul if the magnetic field is generated on the other side of the composite layup. In some examples, the composite layup may be at least partially susceptible to the magnetic field, which allows direct heating the composite layup. The direct heating may be performed together with heat transfer from the caul and/or the susceptor.

In some examples, the step of heating the composite layup and the step of applying pressure using the bladder overlap in time. For example, additional gas may be delivered into the bladder. In the same or other examples, the volume of the bladder may be decreased, e.g., by changing the space between two dies.

In some examples, the mandrel comprises one or more thermal expansion slots. The thermal expansion slots change their widths during the step of heating the composite layup. The caul extends over at least one of the thermal expansion slots. In other words, the caul bridges at least one of the thermal expansion slots and allows the edges of the mandrel (forming the slot) to move with respect to each other without interfering with the composite layup or, more specifically, with the non-planar portion of the composite layup.

In some examples, the caul is a continuous sheet extending substantially the entire length of the mandrel and over thermal expansion slots or, more specifically, over all of the thermal expansion slots. In other words, the same single caul may cover all of the thermal expansion slots. Addition of the caul minimizes and, in some examples, completely eliminates any direct physical contact between the mandrel and the composite layup. As such, the mandrel does not directly interface the composite layup and can expand and contract at higher rates than the composite layup without creating shear forces and interfering with the composite layup. Furthermore, the caul may provide additional localized feature to the non-planar portion.

In some examples, the mandrel comprises aluminum. In the same or other examples, the caul is formed from an alloy comprising an iron. The alloy may further comprise nickel. The concentration of nickel in the alloy, when present, is between about 30% atomic and 47% atomic. In some examples, the alloy further comprises cobalt. The concentration of nickel in the alloy may be between about 20% atomic and 40% atomic, while the concentration of cobalt in the same alloy is between about 10% atomic and 20% atomic. These material compositions provide CTE values that are closer to the composite layup than to the mandrel. Furthermore, in some examples, these materials are able to interact with the magnetic field generated by the induction heater and provide localized heating of the non-planar portion of the composite layup.

In some examples, the caul has a thickness of between about 0.3 millimeters and 0.7 millimeter. This thickness allows the caul to conform to the shape of the mandrel. At the same time, the caul is able support the pressure from the composite layup in the area of the thermal expansion slots such that the caul does not deform into the thermal expansion slots of the mandrel. Furthermore, this thickness provides induction heating of the caul when the caul is exposed to the magnetic field generated by the induction heater. In some examples, the caul has a non-planar shape, for example, the shape conforming to the surface of the mandrel.

In some examples, the step of heating the composite layup and the step of applying the pressure using the bladder forms a composite part from the composite layup. Some examples of the composite part include a wing component comprising a stiffener, a flight control surface, and a fuselage door.

Also provided is an induction heating cell for processing (e.g., curing and/or consolidating) the composite layup. The composite layup comprises a planar portion and a non-planar portion, extending away from the planar portion. The induction heating cell comprises a die, an induction heater, a caul, a mandrel, and a bladder. The die is configured to receive the composite layup. The induction heater is configured to inductively heat the composite layup. The caul is configured to position over and conform to the non-planar portion of the composite layup and to transfer pressure from the mandrel to the composite layup. The mandrel is configured to position over the caul. The difference between the CTE of the caul and the CTE of the composite layup is less than the difference between the CTE of the mandrel and the CTE of the caul. The caul is positioned between the composite layup and the mandrel and physically isolates the composite layup and the mandrel. The caul allows for the mandrel to have thermal expansions and contractions much larger than that of the composite layup without causing applying major shear forces to the surface of the composite layup and potentially wrinkling the surface. The bladder is configured to position over the mandrel and the planar portion of the composite layup.

In some examples, the caul is susceptible to a magnetic field generated by the induction heater. The caul is configured to generate heat and indirectly heat the non-planar portion of the composite layup. In some examples, the induction heater comprises a susceptor for generating heat and heating the composite layup.

In some examples, the mandrel comprises thermal expansion slots. The thermal expansion slots are configured change widths the step of heating the composite layup. The caul extends over at least one of the thermal expansion slots. The caul may be a continuous sheet extending substantially an entire length of the mandrel and over all of the thermal expansion slots.

In some examples, the mandrel comprises aluminum. The caul is formed from an alloy comprising an iron. The alloy may further comprise nickel. In some examples, the concentration of nickel in the alloy is between about 30% atomic and 47% atomic. The alloy further comprises cobalt. The concentration of nickel in the alloy may be between about 20% atomic and 40% atomic, while the concentration of cobalt in the alloy may be between about 10% atomic and 20% atomic.

In some examples, the caul has a thickness of between about 0.3 millimeters and 0.7 millimeter. The caul may have a non-planar shape.

BRIEF DESCRIPTION OF THE DRAWINGS

FIGS. 1A and 1B illustrate cross-sectional views of an induction heating cell, in accordance with some examples.

FIGS. 2A-2C illustrate perspective views of a mandrel with and without a caul, in accordance with some examples.

DETAILED DESCRIPTION

Figure 1A:
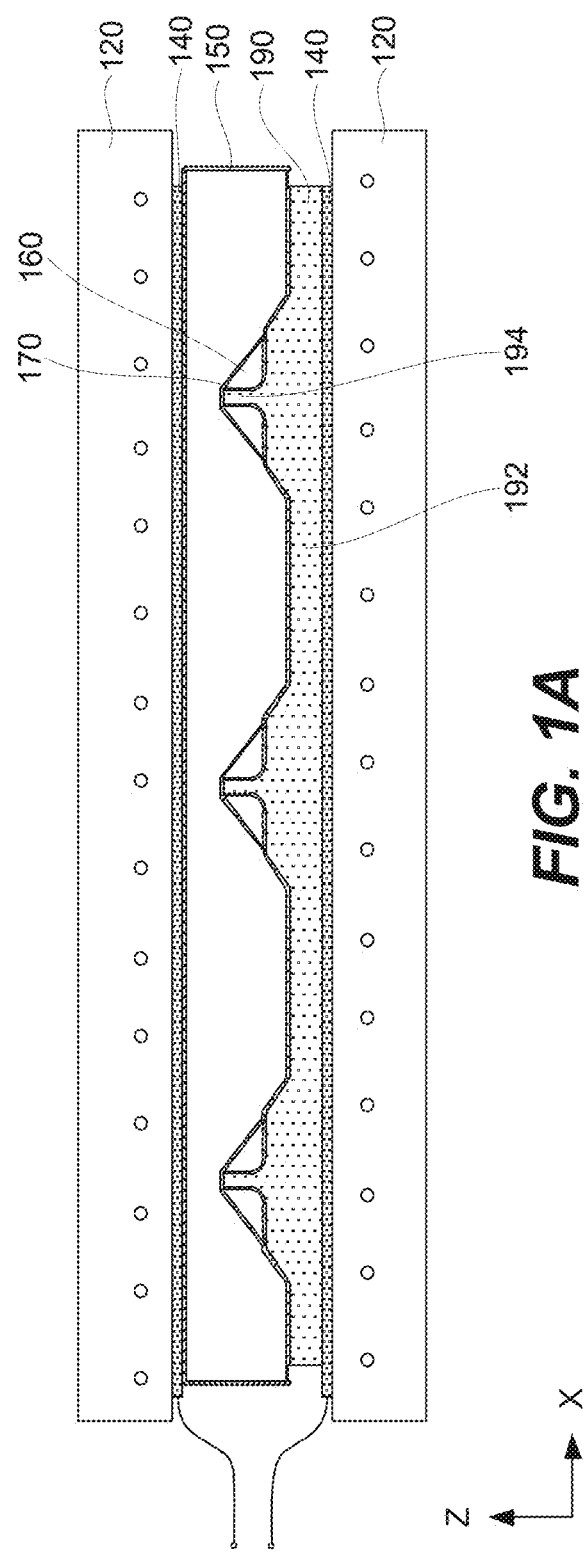

In the following description, numerous specific details are set forth in order to provide a thorough understanding of the presented concepts. The presented concepts may be practiced without some or all of these specific details. In other instances, well known process operations have not been described in detail so as to not unnecessarily obscure the described concepts. While some concepts will be described in conjunction with the specific examples, it will be understood that these examples are not intended to be limiting.

INTRODUCTION

Composite materials, such as fiber-reinforced resins, are becoming increasingly popular for various applications, such as aircraft, automotive, and the like. These materials have a high strength-to-weight or high stiffness-to-weight ratio, and desirable fatigue characteristics. In some examples, during fabrication, prepregs comprising continuous, woven, and/or chopped fibers embedded into an uncured matrix material (e.g., an organic resin) are stacked. This stack, which may be also referred to as a composite layup, is placed into an induction heating cell for processing, which involves heating and application of pressure. One having ordinary skill in the art would understand that various other applications of induction heating cells are also within the scope of this disclosure. For simplicity, the reference will be made to a processed part and examples are directed to composite materials.

In some examples, the composite layup and the resulting composite part, formed from the composite layup in the induction heating cell, comprise a planar portion and a non-planar portion. For purposes of this disclosure, the non-planar portion is defined as a feature which extends at least in part in the direction perpendicular to the planar portion. However, other examples can be any shape or angle relative to the planar portion. One example of parts with complex geometry includes wing structures having planar portions and one or more stiffeners extending away from these planar portions.

While the composite layup is processed in the induction heating cell, pressure and heat are applied uniformly to all portions of the processed part, e.g., the planar portion and the non-planar portion. Establishing and maintaining the pressure and heat uniformity on the planar portion is straightforward. For example, the pressure may be applied using a bladder pressed against the surface. The bladder establishes uniform contact with the surface of the planar portion. The heat may be applied using an induction heater or, more specifically, a susceptor of the induction heater, which may be positioned at a set distance from the planar portion. However, the uniformity of the pressure and/or heat applied to the non-planar portion is a lot more challenging. First, the pressure may be applied in different directions because of the curvature of the non-planar portion and/or because of the different orientation of the surface of the non-planar portion relative to the surface of the planar portion. The bladder may not be sufficiently flexible to easily conform to the entire surface of the non-planar portion and may cause non-uniformity in the application of pressure. For example, the bladder may not be able to reach into tight corners of the non-planar features because of the bladder limited flexibility and stretchability. Mandrels may be used to accommodate various shapes and surfaces of the non-planar portion to equalize the pressure. Furthermore, different areas of the non-planar portion may be positioned at different distances from the induction heater due to the orientation of the non-planar portion. When mandrels are used, these mandrels can act as heat sinks further complicating the uniform heat transfer to the non-planar portion of the composite layup. Furthermore, the CTE of mandrels may be quite different from the CTE of the composite layup, which may cause different thermal expansion and contraction of the mandrel and the composite layup and possible high shear forces at the interface and wrinkling of the composite layup.

It has been found that addition of a caul between one or more mandrels and a composite layup addresses various problems associated with forming composite parts with complex geometries. The caul may be a metal, plastic, or rubber structure (e.g., sheet) with two smooth parallel surfaces. The caul may be also referred to as a caul plate. The caul may be sized and shaped for the composite layup and/or the mandrels, with which it will be used. Specifically, the caul may have a direct contact with the layup during the curing process to transmit pressure and provide a smooth surface on the finished part. The caul may interface the non-planar portion of the composite layup where the mandrel is needed to provide uniform application of pressure. The caul may be substantially flexible and conformal to the surface of the non-planar portion and to the mandrel. As such, the mandrel may retain its shape-defining characteristics. The material of the caul may be specifically selected to match the CTE of the composite layup or be closer to the CTE of the composite layup than to the CTE of the mandrel. As such, the mandrel may undergo its thermal expansions and contractions without impact to the composite layup.

Apparatus Examples

FIGS. 1A and 1B illustrate an example of induction heating cell 100. Induction heating cell 100 may be used for processing (e.g., consolidation and/or curing) of composite layup 190. However, other applications of induction heating cell 100 are also within the scope.

Referring to FIG. 1A and, more specifically to FIG. 1B, composite layup 190, processed in induction heating cell 100, comprises planar portion 192 and non-planar portion 194. Non-planar portion 194 extending away from planar portion 192, e.g., at least in part in the direction perpendicular to planar portion 192 (the Z direction in FIG. 1B). The presence of non-planar portion 194 complicates various aspects of applying heat and pressure to composite layup 190. For example, non-planar portion 194 may extends away from heat sources, such as susceptor 144 of induction heater 140. Furthermore, during processing of composite layup 190, the pressure applied to non-planar portion 194 needs to be in a different direction (sometimes multiple different directions) than the pressure applied to planar portion 192.

Referring to FIG. 1A, Induction heating cell 100 comprises one or more dies 120, induction heater 140, caul 170, one or more mandrels 160, and bladder 150. During operation of induction heating cell 100, composite layup 190 is disposed between die 120 and bladder 150 and is subject to heat and/or pressure. The heat is provided by induction heater 140. The pressure is provided by bladder 150.

In some examples, induction heater 140 comprises induction coils 142 (e.g., solenoidal type induction coils) as, for example, shown in FIG. 2B. Induction coils 142 are configured to generate a magnetic field. Induction heater 140 may also comprise one or more susceptors 144, which are thermally coupled to composite layup 190. For example, FIG. 1B illustrates composite layup 190 directly interfacing susceptor 144. In some examples, susceptor 144 is formed from aluminum or an aluminum alloy.

Inductive heating is accomplished by providing an alternating electrical current to induction coils 142. This alternating current produces an alternating magnetic field near composite layup 190, susceptor 144 (when used), and caul 170. The heat is generated in one or more of these components via eddy current heating, which may be also referred to as inductive heating. In some example, composite layup 190 is heated directly by the magnetic field, which may be referred to as direct inductive heating. For example, composite layup 190 may comprise graphite or boron reinforced organic matrix composites, which are sufficiently susceptible to magnetic fields. In some examples, susceptor 144 is used for indirect heating of composite layup 190, in addition to or instead of direct inductive heating of composite layup 190. Specifically, susceptor 144 is inductively heated and then transfers heat to composite layup 190, which is thermally coupled to susceptor 144. This type of heating may be referred to as indirect heating. In some examples, caul 170 may provide indirect heating of composite layup 190 in addition to or instead of indirect heating by susceptor and/or direct inductive heating of composite layup 190. Caul 170 is operable similar to susceptor 144, i.e., inductively heated by the magnetic field and transfers heat to specific portions of composite layup 190. Specifically, as shown in FIG. 1B, caul 170 is thermally coupled to non-planar portion 194 of composite layup 190. This type of heating provided by caul 170 may be also referred to as local heating.

The frequency at which the coil driver drives induction coils 142 depends upon the nature of composite layup 190, susceptor 144, and caul 170 as well as processing parameters, and other factors. For example, the current penetration of copper at 3 kHz is approximately 1.5 millimeters, while the current penetration at 10 kHz is approximately 0.7 millimeters. The shape of the coil is used for controlling the magnetic field uniformity and, as a result, the heating/temperature uniformity.

The pressure is provided by combined operations of one or more dies 120 and bladder 150. For example, as shown in FIG. 1A, induction heating cell 100 include two dies 120. Changing the space available for composite layup 190 and bladder 150 may be used to increase or decrease the pressure inside bladder 150 and the pressure which bladder 150 and one of dies 120 acts on composite layup 190. Furthermore, the gas may be pumped into or from bladder 150 to control the pressure. Specifically, bladder 150 may be connected to a gas source, pump, valve, and the like.

In some examples, bladder 150 may be formed from a thin metal sheet (e.g., aluminum or an aluminum alloy, magnesium or a magnesium alloy), a polymer sheet, or other like materials. Specific characteristics of bladder 150 include an ability to hold pressure, thermal stability, flexibility, conformity, and thermal expansion characteristics. The flexibility of bladder 150 provides an even distribution of pressure and conform, for example, to ply drops or other features of composite layup 190. The thermal expansion characteristics of bladder 150 allows for removal of bladder 150 after processing composite layup 190.

In some examples, die 120 is made from a material that is not susceptible to inductive heating, such as composites and/or ceramics. The material of die 120 may have a low coefficient of thermal expansion, good thermal shock resistance, and relatively high compression strength. A specific example is a silica ceramic or, even more specific, castable fused silica ceramic.

In some examples, dies 120 are positioned between bolsters (not shown) used for supporting dies 120 and controlling position of dies 120. The bolsters provide rigid flat backing surfaces. In some examples, the bolsters are formed of steel, aluminum, or any other material capable of handling the loads present during panel forming. In specific examples, a non-magnetic material, such as aluminum or some steel alloys, is used for the bolsters to avoid any distortion to the magnetic field produced by induction heater 140.

As shown in FIG. 1B and further in FIGS. 2A-2C, induction heating cell 100 comprises one or more mandrels 160. During operation of induction heating cell 100, induction heating cell 100 conform to the shape of non-planar portion 194 and are used to apply the uniform pressure to surface 195 of non-planar portion 194. Mandrel 160 may be a single continuous structure extending in one direction, e.g., the Y direction. Mandrel 160 may have one or more thermal expansion slots 162 extending perpendicular to the extension direction. Alternatively, multiple disjoined mandrels 160 may be stacked in the extension direction with one or more thermal expansion slots 162 separating these disjoined mandrels 160. Both examples are within the scope of this disclosure. For simplicity, the reference will be made to mandrel 160, which covers both examples. Likewise, the reference will be made to thermal expansion slots 162 regardless of the number of these slots (e.g., one, two, three, etc.).

Thermal expansion slots 162 are sized based on the CTE of mandrel 160 and the CTE of composite layup 190 such that the total expansion along the extension direction is substantially the same for composite layup 190 and for mandrel 160. In some examples, mandrel 160 comprises aluminum or, more specifically, aluminum alloy. Aluminum has a high thermal conductivity, which may help with maintaining the temperature uniformity in the entire system. Composite layup 190 may be a graphite reinforced composite. The CTE of aluminum is $22\times10^{-6}$ m/(m*° C.), while the CTE of a graphite reinforced composite is about $2\times10^{-6}$ m/(m*° C.). Therefore, for each meter in one direction and the increase in temperature of 100° C., the aluminum structure will expand 2 millimeters more than the composite structure. For these materials and processing conditions, mandrel 160 may use one or more thermal expansion slots 162 having a total width of 2 millimeters for each 1-meter length in the extension direction. One having ordinary skills in the art would understand how to scale these parameters for other materials and/or processing conditions. Mandrel 160 is operable as a forming tool for composite layup 190. After positioning composite layup 190 over die 120, mandrel 160 may be placed over composite layup 190.

Referring to FIG. 1B, caul 170 is positioned between mandrel 160 and composite layup 190 or, more specifically, at least between mandrel 160 and at least non-planar portion 194 composite layup 190. Unlike mandrel 160, caul 170 is formed from a material, which has the CTE close to the CTE of composite layup 190. More specifically, the difference between the CTE of caul 170 and the CTE of composite layup 190 is less than difference between the CTE of mandrel 160 and the CTE of caul 170. In some examples, caul 170 is formed from an alloy comprising an iron. This alloy may further comprise nickel with the concentration of nickel in alloy being, for example, between about 30% atomic and 47% atomic. In some examples, the alloy further comprises cobalt. In these examples, the concentration of nickel in alloy may be between about 20% atomic and 40% atomic, while the concentration of cobalt in alloy may be between about 10% atomic and 20% atomic.

In some examples, the CTE of caul 170 is between about $2\times10^{-6}$ m/(m*° C.) and $8\times10^{-6}$ m/(m*° C.) or, more specifically, between about $3\times10^{-6}$ m/(m*° C.) and $7\times10^{-6}$ m/(m*° C.) such as between about $5\times10^{-6}$ m/(m*° C.) and $6\times10^{-6}$ m/(m*° C.). The CTE of composite layup 190 may be between about $1\times10^{-6}$ m/(m*° C.) and $3\times10^{-6}$ m/(m*° C.) or, more specifically, between about $2.5\times10^{-6}$ m/(m*° C.) and $3.5\times10^{7}$ m/(m*° C.). The CTE of mandrel 160 may be at least about $15\times10^{-6}$ m/(m*° C.) or even at least about $20\times10^{-6}$ m/(m*° C.), such as between about $20\times10^{-6}$ m/(m*° C.) and $25\times10^{-6}$ m/(m*° C.).

As shown in FIGS. 2B and 2C, caul 170 extends over thermal expansion slots 162 of mandrel 160. As such, caul 170 isolates composite layup 190 from mandrel 160 (and mandrel's large thermal expansions and contractions) and, in particular from the edges of expansion slots 162 where the expansions and contractions are greatest. Furthermore, caul 170 prevents composite layup 190 from extending into expansion slots 162. It should be noted that composite layup 190 may flow during processing due to heat and pressure.

Furthermore, the surface of caul 170 interfacing mandrel 160 is mechanically stronger than, for example, surface 195 of non-planar portion 194 of composite layup 190. As such, caul 170 is more capable of withstanding thermal expansions and contractions of mandrel 160 and associated shear forces acting on composite layup 190. These shear forces may be substantial due to the pressure in the stack formed by mandrel 160, caul 170, and composite layup 190. As shown in FIG. 2B, caul 170 may be a continuous sheet extending substantially an entire length of mandrel 160 and over all thermal expansion slots 162 of mandrel 160.

Caul 170 is substantially conformal to the shape of mandrel 160 and does not interfere with the shape-forming functionality of mandrel 160. As such, caul 170 may have a non-planar shape. In some examples, caul 170 has a thickness of between about 0.3 millimeters and 0.7 millimeter. Caul 170 may have a non-planar shape.

In some examples, caul 170 is susceptible to a magnetic field generated by induction heater 140. Specifically, caul 170 is configured to generate heat and indirectly heat non-planar portion 194 of composite layup 190, thereby creating localized heating. As shown in FIG. 1B, non-planar portion 194 may be further away from susceptor 144 of induction heater 140 than other parts of composite layup 190 such as planar portion 192 making it more difficult to heat non-planar portion 194 using only susceptor 144. At the same time, temperature uniformity may be important for processing (e.g., curing and/or consolidation) of composite layup 190.

Processing Examples

Figure 3:
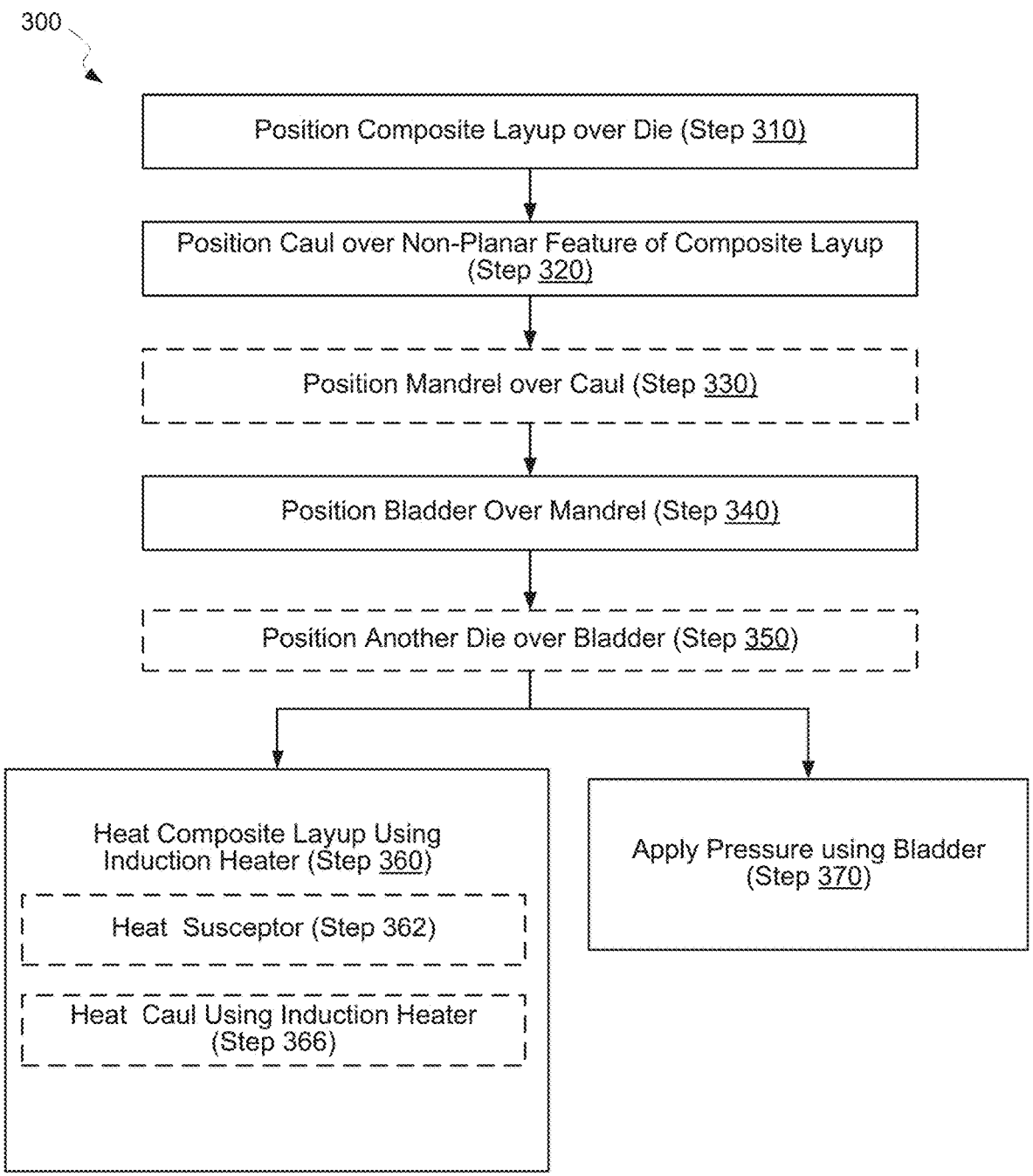
FIG. 3 is a process flowchart of a method of operating an induction heating cell, for example, to form a composite part, in accordance with some examples.

FIG. 3 illustrates a process flowchart corresponding to method 300, which may be used to form composite part 191 having complex surface geometry. Composite part 191 is formed from composite layup 190. FIGS. 4A-4F are schematic representations of different stages of method 300, in accordance with some examples.

Figure 4A:
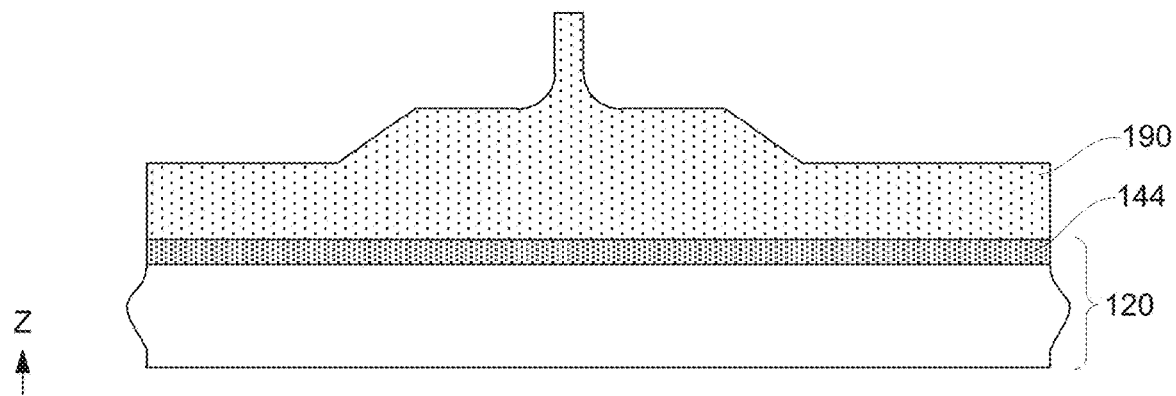
FIGS. 4A-4F illustrate an induction heating cell at various stages of the method of forming the composite part.

Method 300 comprises step of positioning 310 composite layup 190 over die 120. Composite layup 190 comprises planar portion 192 and non-planar portion 194, extending away from planar portion 192 in a direction away from die 120. FIG. 4A illustrates an example of composite layup 190 disposed over die 120 or, more specifically, disposed over susceptor 144 positioned over die 120. Non-planar portion 194 extends away from planar portion 192 in at least the Z direction. In some examples, composite layup 190 may be positioned onto bladder 150.

After this step, composite layup 190 may directly interface die 120 and/or susceptor 144. In some examples, the surface of die 120 and/or susceptor 144 interfacing composite layup 190 define the shape of this portion of composite layup 190. While FIG. 4A illustrates the bottom surface of composite layup 190 being planar, one having ordinary skills in the art would understand that different kinds of shapes are within the scope.

Various positioning techniques may be used during this step. For example, composite layup 190 may be positioned using at least one of braiding, tape layup, tow layup, or any other desirable composite layup technique. Furthermore, step of positioning 310 may involve laser assisting to ensure precise positioning of individual parts (e.g., plies) forming composite layup 190.

In some examples, composite layup 190 comprises at least one of braided thermoplastic material, tacked thermoplastic material, or any other suitable thermoplastic material. The thickness of composite layup 190 may be constant or varying throughout composite layup 190. For example, composite layup 190 may have ply drops or ply additions which cause the thickness to vary, e.g., to form non-planar portion 194.

Figure 4B:
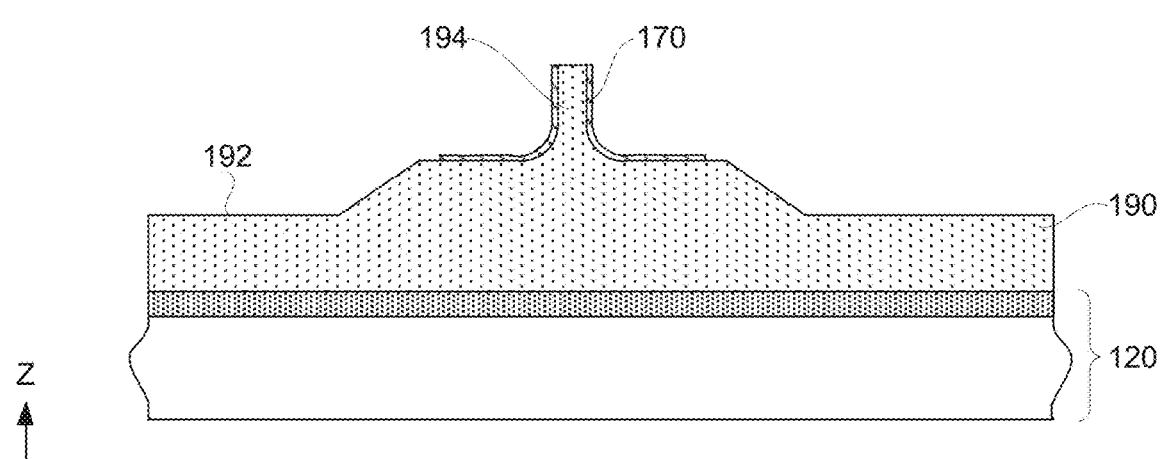

Method 300 further comprises step of positioning 320 caul 170 over non-planar portion 194 of composite layup 190. Caul 170 is configured to conform to surface 195 of non-planar portion 194. Various examples of caul are described above. In some examples, the CTE of caul 170 is closer to the CTE of composite layup 190 than to the CTE of mandrel 160. For example, caul 170 may be formed from an alloy comprising an iron and, in some examples, nickel. In some examples, the alloy further comprises cobalt. Caul 170 is able to conform to the shape of non-planar portion 194 and to the shape of mandrel 160. As such, caul 170 may be sufficiently thin (e.g., between about 0.3 millimeters and 0.7 millimeter). After completing this step, caul 170 directly interfaces non-planar portion 194 of composite layup 190. FIG. 4B illustrates an example of caul 170 positioned over non-planar portion 194 of composite layup 190. Caul 170 is shown without mandrel 160, which may be introduced at later operations.

Method 300 comprises optional step of positioning 330 one or more mandrels 160 over caul 170 such that caul 170 is disposed between one or more mandrels 160 and non-planar portion 194. This step is optional. In some examples, caul 170 is attached to one or more mandrels 160 prior to performing method 300.

Figure 4C:
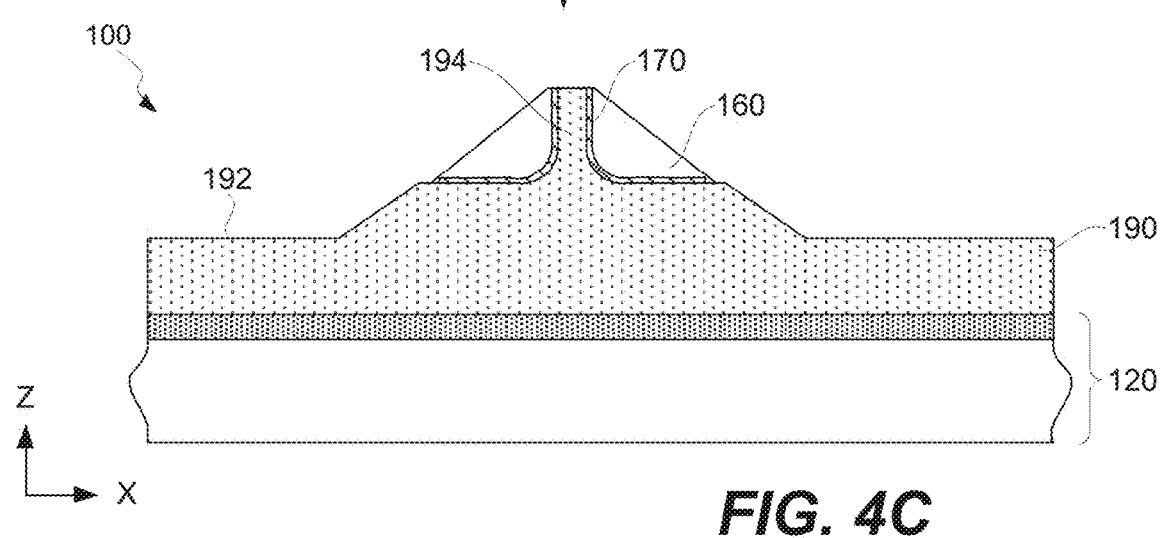

Various examples of mandrels 160 are described above. In some examples, one or more mandrels 160 comprises thermal expansion slots 162, which change widths during thermal cycling of mandrels 160, e.g., during step of heating 360 composite layup 190. Caul 170 bridges thermal expansion slots 162 such that composite layup 190 cannot penetrate into thermal expansion slots 162. Furthermore, caul 170 separates composite layup 190 from mandrels 160 and allows mandrels 160 to expand and contract without interfering with composite layup 190. This allows forming mandrels 160 from any suitable materials, such as aluminum or aluminum alloys. FIG. 4C illustrates an example of mandrel 160 positioned over caul 170.

Figure 4D:
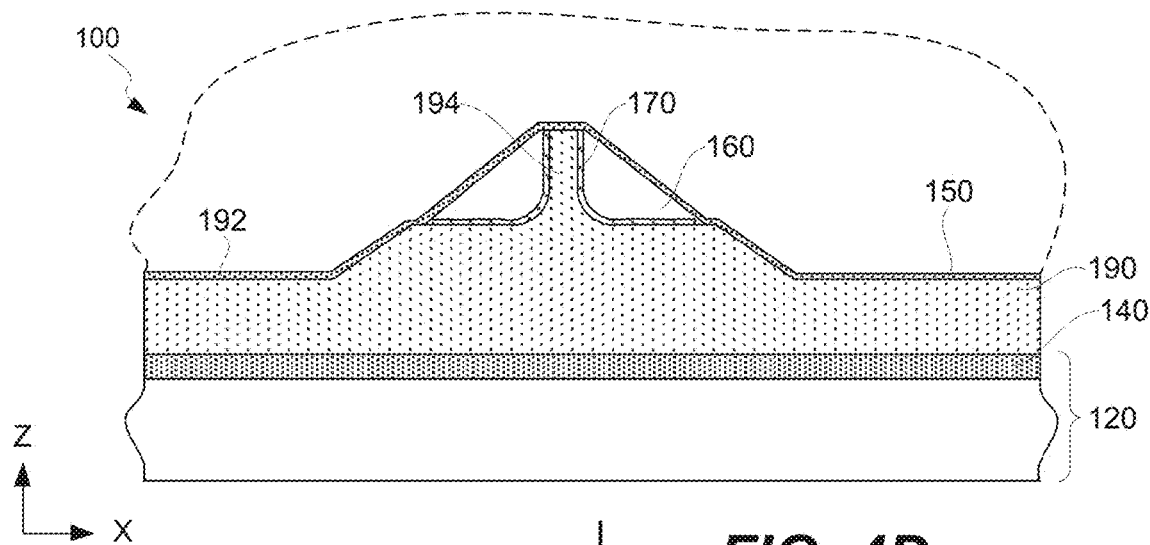
Figure 4E:
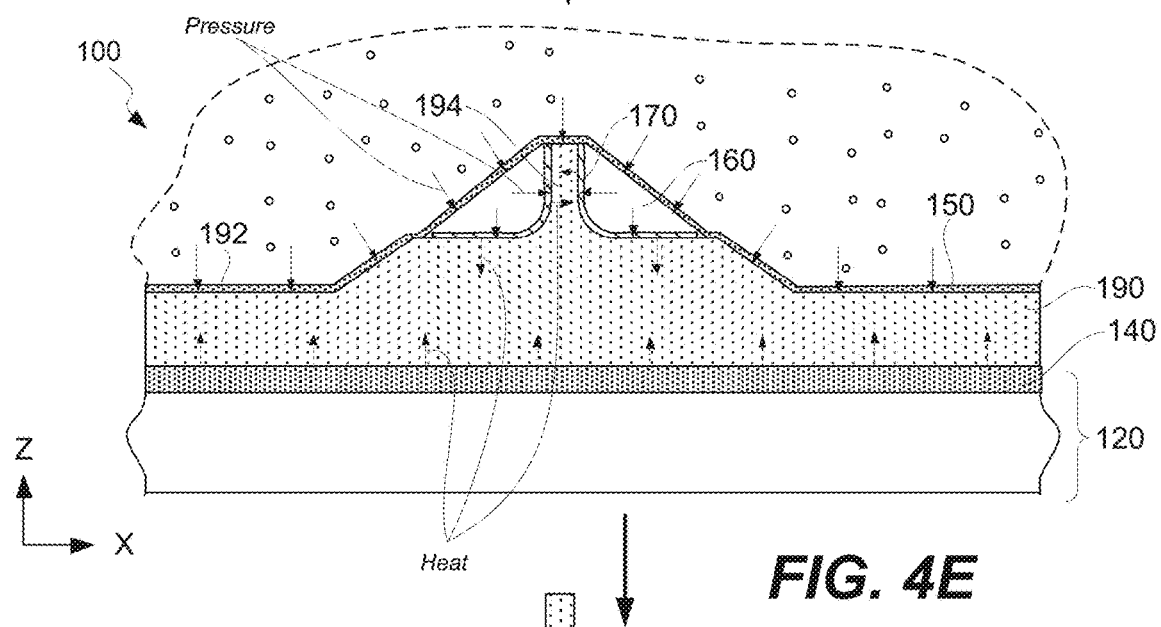
Figure 4F:
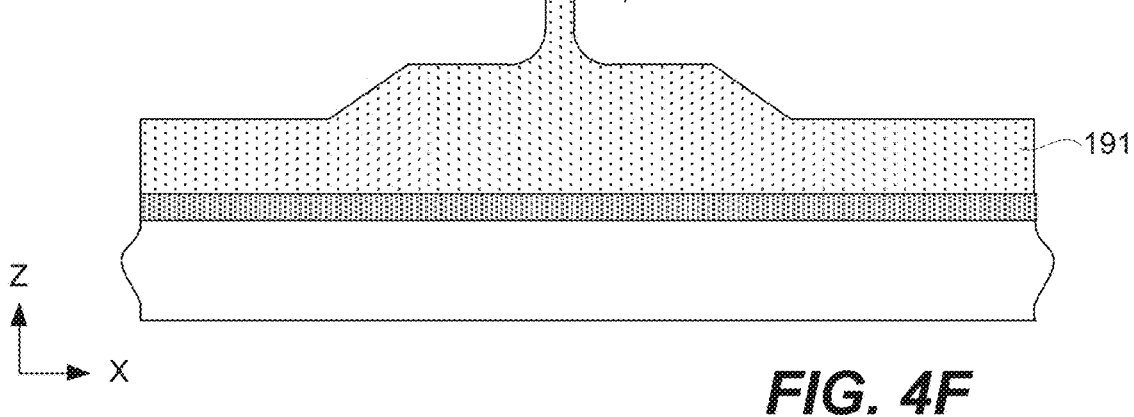

Method 300 comprises step of positioning 340 bladder 150 over one or more mandrels 160 and over planar portion 192 of composite layup 190. Bladder 150 is used for applying and maintaining uniform pressure on composite layup 190. In some examples, bladder 150 may directly interface over one or more mandrels 160 and planar portion 192 of composite layup 190 as shown in FIG. 4D.

Method 300 comprises step of heating 360 composite layup 190 using induction heater 140. For example, induction coil 142 may generate a magnetic field, which interacts with composite layup 190 directly (e.g., when composite layup 190 is susceptible to the magnetic field) and/or with susceptor 144 (e.g., when susceptor 144 is used). Specifically, when susceptor 144 is used, step of heating 360 composite layup 190 comprises step of inductively heating 362 susceptor 144 of induction heater 140 using the magnetic field. Susceptor 144 is thermally coupled to composite layup 190 and transfers generated heat to composite layup 190. Various examples of direct and indirect heating of composite layup 190 are also described below.

In some examples, step of heating 360 composite layup 190 comprises optional step of inductively heating 366 caul 170. Similar to composite layup 190 and/or susceptor 144, caul 170 is inductively heated using the magnetic field generated by induction heater 140. This provides localized heating of non-planar portion 194 of composite layup 190, which may be further away from a heating component of induction heater 140, such as a susceptor.

Method 300 comprises step of applying 370 pressure onto one or more mandrels 160 and planar portion 192 of composite layup 190 using bladder 150. For example, the space occupied by bladder 150 may be reduced to increase the pressure inside bladder 150 (e.g., the space between two dies may be reduced). In the same or other example, a gas may be supplied into bladder 150 to increase its pressure.

When composite layup 190 is a braided thermoplastic material, slits of composite layup 190 may move relative to each other. This movement of the braided slits of composite layup 190 may occur during the pressure application step. Movement of the braided slits of composite layup 190 may improve the quality of resulting composite part 191. When bladder 150 is pressurized, the dies provide resistant pressure. In other words, the dies may provide a substantially rigid outer mold line.

As composite layup 190 is heated and compressed, thermoplastic materials of composite layup 190 are consolidated. For example, the resin of composite layup 190 flows and solidifies. In some examples, step of heating 360 composite layup 190 and step of applying 370 pressure using bladder 150 overlap in time. In some examples, step of heating 360 composite layup 190 and step of applying 370 pressure using bladder 150 forms a composite part 191 from composite layup 190.

Some examples of composite part 191 include a wing component comprising a stiffener, a flight control surface, and a fuselage door. It should be noted that composite materials are used in aircraft to decrease the weight of the aircraft. This decreased weight improves performance features such as payload capacity and fuel efficiency. Further, composite materials provide longer service life for various components in an aircraft.

Although the illustrative examples for an illustrative example are described with respect to an aircraft, an illustrative example may be applied to other types of platforms. The platform may be, for example, a mobile platform, a stationary platform, a land-based structure, an aquatic-based structure, and a space-based structure. More specifically, the platform, may be a surface ship, a tank, a personnel carrier, a train, a spacecraft, a space station, a satellite, a submarine, an automobile, a power plant, a bridge, a dam, a house, a windmill, a manufacturing facility, a building, and other suitable platforms.

Aircraft Examples

While the systems, apparatus, and methods disclosed above have been described with reference to aircrafts and the aerospace industry, it will be appreciated that the examples disclosed herein may be applied to any other context as well, such as automotive, railroad, and other mechanical and vehicular contexts.

Figure 5:
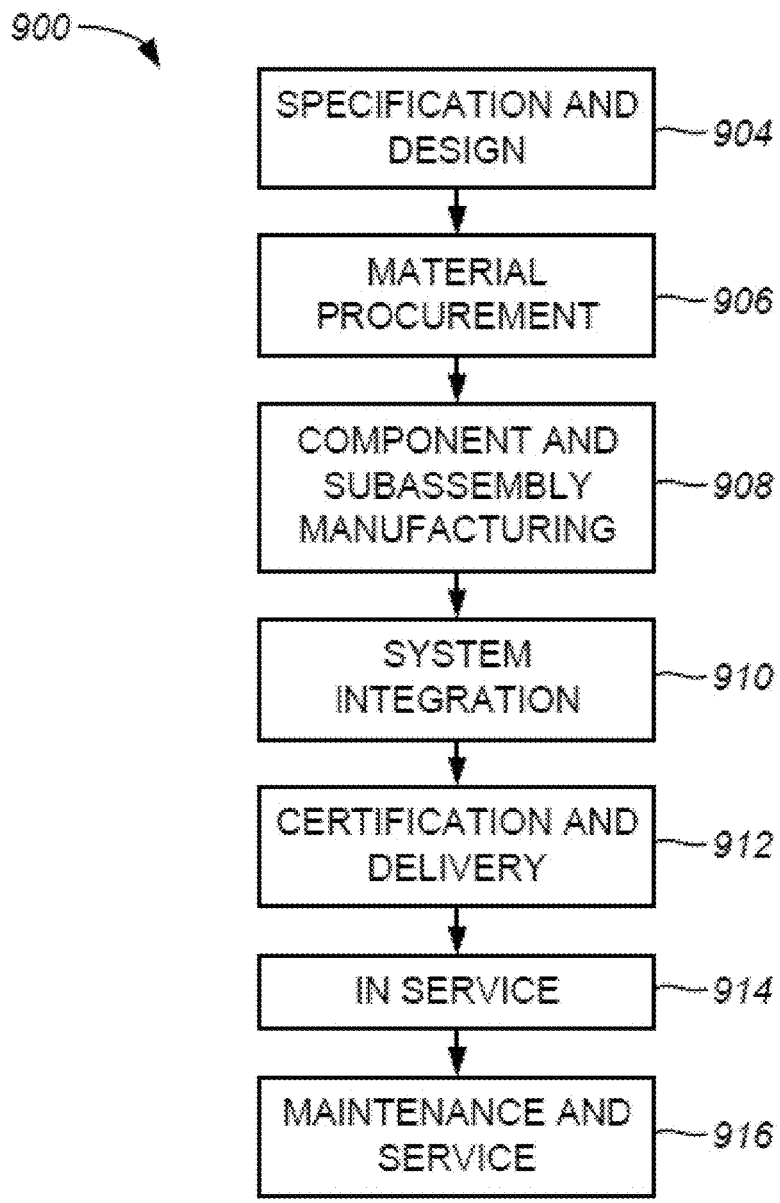
FIG. 5 illustrates a flow chart of an example of an aircraft production and service methodology, in accordance with some examples.
Figure 6:
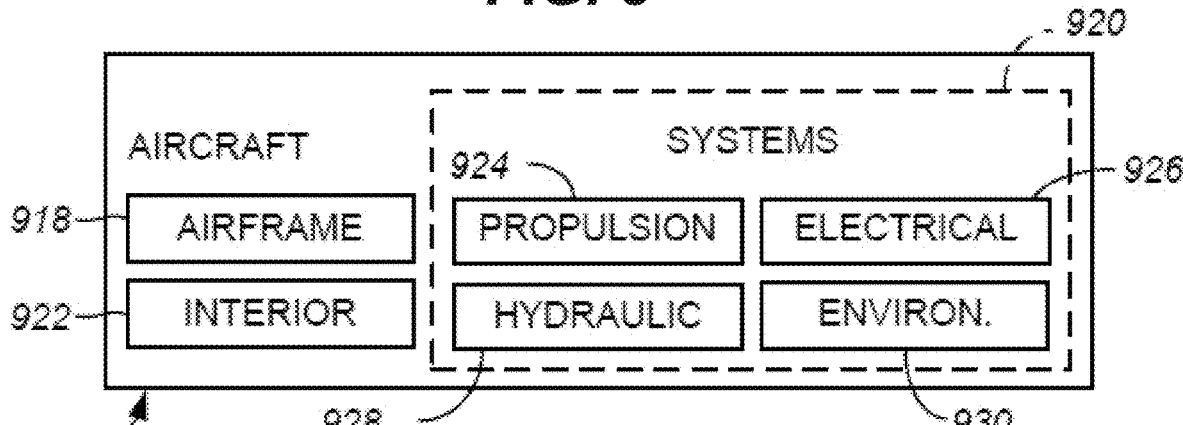
FIG. 6 illustrates a block diagram of an example of an aircraft, in accordance with some examples.

Accordingly, examples of the disclosure may be described in the context of an aircraft manufacturing and service method 900 as shown in FIG. 5 and aircraft 920 as shown in FIG. 6. During pre-production, illustrative method 900 may include the specification and design 904 of the aircraft 920 and material procurement 906. During production, component and subassembly manufacturing 908 and system integration 910 of aircraft 920 takes place. Thereafter, aircraft 920 may go through certification and delivery 912 in order to be placed in service 914. While in service by a customer, aircraft 920 is scheduled for routine maintenance and service 916 (which may also include modification, reconfiguration, refurbishment, and so on).

Each of the processes of method 900 may be performed or carried out by a system integrator, a third party, and/or an operator (e.g., a customer). For the purposes of this description, a system integrator may include without limitation any number of aircraft manufacturers and major-system subcontractors; a third party may include without limitation any number of venders, subcontractors, and suppliers; and an operator may be an airline, leasing company, military entity, service organization, and so on.

As shown in FIG. 6, aircraft 920 produced by illustrative method 900 may include airframe 918 with plurality of systems 920 and interior 922. Examples of high-level systems 920 include one or more of propulsion system 924, electrical system 926, hydraulic system 928, and environmental system 930. Any number of other systems may be included. Although an aerospace example is shown, the principles of the examples disclosed herein may be applied to other industries, such as the automotive industry.

Apparatus and methods embodied herein may be employed during any one or more of the stages of the production and service method 900. For example, components or subassemblies corresponding to component and subassembly manufacturing 908 may be fabricated or manufactured in a manner similar to components or subassemblies produced while aircraft 920 is in service. Also, one or more apparatus examples, method examples, or a combination thereof may be utilized during the manufacturing 908 and system integration 910, for example, by substantially expediting assembly of or reducing the cost of aircraft 920. Similarly, one or more of apparatus examples, method examples, or a combination thereof may be utilized while aircraft 920 is in service, for example and without limitation, to maintenance and service 916.

Although the foregoing concepts have been described in some detail for purposes of clarity of understanding, it will be apparent that certain changes and modifications may be practiced within the scope of the appended claims. It should be noted that there are many alternative ways of implementing the processes, systems, and apparatus. Accordingly, the present examples are to be considered as illustrative and not restrictive.

CONCLUSION

Illustrative, non-exclusive examples of inventive features according to present disclosure are described in following enumerated paragraphs:

A1. Method 300 comprising:
    step of positioning 310 composite layup 190 over die 120, wherein:
        composite layup 190 comprises planar portion 192 and non-planar portion 194, extending away from planar portion 192 in a direction away from die 120, and
    step of positioning 320 caul 170 over non-planar portion 194 of composite layup 190, wherein:
        caul 170 is configured to conform to surface 195 of non-planar portion 194;
    step of positioning 330 mandrel 160 over caul 170, wherein:
        caul 170 is disposed between mandrel 160 and non-planar portion 194, and
        a difference between the CTE of caul 170 and the CTE of composite layup 190 is less than difference between the CTE of mandrel 160 and the CTE of caul 170;
    step of positioning 340 bladder 150 over mandrel 160 and over planar portion 192 of composite layup 190;
    step of heating 360 composite layup 190 using an induction heater 140; and
    step of applying 370 pressure using bladder 150 onto mandrel 160 and planar portion 192 of composite layup 190.

A2. Method 300 according to paragraph A1, wherein step of heating 360 composite layup 190 using induction heater 140 comprises step of inductively heating 366 caul 170 using a magnetic field generated by induction heater 140.

A3. Method 300 according to paragraphs A1-A2, wherein caul 170 directly interfaces non-planar portion 194 of composite layup 190.

A4. Method 300 according to paragraphs A1-A3, wherein step of heating 360 composite layup 190 using induction heater 140 comprising step of inductively heating 362 susceptor 144 of induction heater 140 using the magnetic field generated by induction heater 140.

A5. Method 300 according to paragraphs A1-A4, wherein composite layup 190 is disposed between susceptor 144 and caul 170.

A6. Method 300 according to paragraphs A1-A5, wherein composite layup 190 is at least partially permeable to magnetic field generated by induction heater 140.

A7. Method 300 according to paragraphs A1-A6, wherein step of heating 360 composite layup 190 and step of applying 370 pressure using bladder 150 overlap in time.

A8. Method 300 according to paragraphs A1-A7, wherein:
mandrel 160 comprises thermal expansion slots 162,
thermal expansion slots 162 change widths during step of heating 360 composite layup 190, and
caul 170 extends over at least one of thermal expansion slots 162.

A9. Method 300 according to paragraphs A1-A8, wherein caul 170 is continuous sheet extending substantially the entire length of mandrel 160 and over all of thermal expansion slots 162.

A10. Method 300 according to paragraphs A1-A9, wherein mandrel 160 does not directly interface composite layup 190.

A11. Method 300 according to paragraphs A1-A10, wherein mandrel 160 comprises aluminum.

A12. Method 300 according to paragraphs A1-A11, wherein caul 170 is formed from an alloy comprising an iron.

A13. Method 300 according to paragraph A12, wherein the alloy further comprises nickel.

A14. Method 300 according to paragraph 13, wherein the concentration of nickel in the alloy is between about 30% atomic and 47% atomic.

A15. Method 300 according to paragraph 13, wherein the alloy further comprises cobalt.

A16. Method 300 according to paragraph 15, wherein:
the concentration of nickel in alloy is between about 20% atomic and 40% atomic, and
the concentration of cobalt in alloy is between about 10% atomic and 20% atomic.

A17. Method 300 according to paragraphs A1-A16, wherein caul 170 has a thickness of between about 0.3 millimeters and 0.7 millimeter.

A18. Method 300 according to paragraphs A1-A17, wherein caul 170 has a non-planar shape.

A19. Method 300 according to paragraphs A1-A18, wherein step of heating 360 composite layup 190 and step of applying 370 pressure using bladder 150 forms composite part 191 from composite layup 190.

A20. Method 300 according to paragraph 19, wherein composite part 191 is one of wing component comprising stiffener, flight control surface, or fuselage door.

B1. Induction heating cell 100 for processing composite layup 190 comprising planar portion 192 and non-planar portion 194, extending away from planar portion 192, induction heating cell 100 comprising:
die 120, configured to receive composite layup 190;
induction heater 140, configured to inductively heat composite layup 190;
caul 170, configured to position over and conform to non-planar portion 194 of composite layup 190;
mandrel 160, configured to position over caul 170, wherein the difference between the CTE of caul 170 and the CTE of composite layup 190 is less than difference between the CTE of mandrel 160 and the CTE of caul 170; and
bladder 150, configured to position over mandrel 160 and planar portion 192 of composite layup 190.

B2. Induction heating cell 100 according to paragraph B1, wherein caul 170 is susceptible to a magnetic field generated by induction heater 140 and configured to generate heat and indirectly heat non-planar portion 194 of composite layup 190.

B3. Induction heating cell 100 according to paragraphs B1-B2, wherein induction heater 140 comprises susceptor 144 for generating heat and heating composite layup 190.

B4. Induction heating cell 100 according to paragraphs B1-B3, wherein:
mandrel 160 comprises thermal expansion slots 162,
mandrel 160 is configured to change the widths of thermal expansion slots 162 during thermal cycling, and
caul 170 extends over at least one of thermal expansion slots 162.

B5. Induction heating cell 100 according to paragraphs B1-B4, wherein caul 170 is continuous sheet extending substantially an entire length of mandrel 160 and over all of thermal expansion slots 162.

B6. Induction heating cell 100 according to paragraphs B1-B5, wherein mandrel 160 comprises aluminum.

B7. Induction heating cell 100 according to paragraphs B1-B6, wherein caul 170 is formed from an alloy comprising an iron.

B8. Induction heating cell 100 according to paragraph B7, wherein the alloy further comprises nickel.

B9. Induction heating cell 100 according to paragraph B8, wherein the concentration of nickel in the alloy is between about 30% atomic and 47% atomic.

B10. Induction heating cell 100 according to paragraph B8, wherein the alloy further comprises cobalt.

B11. Induction heating cell 100 according to paragraph 30, wherein:
the concentration of nickel in alloy is between about 20% atomic and 40% atomic, and
the concentration of cobalt in alloy is between about 10% atomic and 20% atomic.

B12. Induction heating cell 100 according to paragraphs B1-B11, wherein caul 170 has a thickness of between about 0.3 millimeters and 0.7 millimeter.

B13. Induction heating cell 100 according to paragraphs B1-B12, wherein caul 170 has a non-planar shape.

What is claimed is:

1. A method comprising:
    a step of positioning a composite layup over a die, wherein the composite layup comprises a non-planar portion, extending away from the die, and
    a step of positioning a caul over the composite layup;
    a step of positioning a mandrel over the caul, wherein a difference between a coefficient of thermal expansion (CTE) of the caul and a CTE of the composite layup is less than a difference between the CTE of the mandrel and the CTE of the caul;
    a step of heating the composite layup; and
    a step of applying pressure onto the mandrel and the composite layup.

2. The method according to claim 1, wherein the caul directly interfaces the non-planar portion of the composite layup.

3. The method according to claim 1, wherein the step of heating the composite layup comprising a step of inductively heating a susceptor.

4. The method according to claim 1, wherein:
    the mandrel comprises thermal expansion slots,
    the thermal expansion slots change widths during the step of heating the composite layup, and the caul extends over at least one of the thermal expansion slots.

5. The method according to claim 1, wherein the caul has a non-planar shape.

6. The method according to claim 1, wherein the step of heating the composite layup forms a composite part from the composite layup.

7. The method according to claim 6, wherein the composite part is one of a wing component comprising a stiffener, a flight control surface, or a fuselage door.

8. An induction heating cell comprising:
a die, configured to receive a composite layup;
an induction heater, configured to inductively heat the composite layup;
a caul, configured to position over and conform to the composite layup; and
a mandrel, configured to position over the caul, wherein a difference between a coefficient of thermal expansion (CTE) of the caul and a CTE of the composite layup is less than a difference between the CTE of the mandrel and the CTE of the caul.

9. The induction heating cell according to claim 8, wherein the caul is susceptible to a magnetic field generated by the induction heater and configured to generate heat and indirectly heat the composite layup.

10. The induction heating cell according to claim 8, wherein the induction heater comprises a susceptor for generating heat and heating the composite layup.

11. The induction heating cell according to claim 8, wherein:
the mandrel comprises thermal expansion slots,
the mandrel is configured to change widths of the thermal expansion slots during thermal cycling, and
the caul extends over at least one of the thermal expansion slots.

12. The induction heating cell according to claim 11, wherein the caul is a continuous sheet extending substantially an entire length of the mandrel and over all of the thermal expansion slots.

13. The induction heating cell according to claim 8, wherein the mandrel comprises aluminum.

14. The induction heating cell according to claim 8, wherein the caul is formed from an alloy comprising an iron.

15. The induction heating cell according to claim 14, wherein the alloy further comprises nickel.

16. The induction heating cell according to claim 15, wherein a concentration of nickel in the alloy is between about 30% atomic and 47% atomic.

17. The induction heating cell according to claim 15, wherein the alloy further comprises cobalt.

18. The induction heating cell according to claim 17, wherein:
a concentration of nickel in the alloy is between about 20% atomic and 40% atomic, and
a concentration of cobalt in the alloy is between about 10% atomic and 20% atomic.

19. The induction heating cell according to claim 8, wherein the caul has a thickness of between about 0.3 millimeters and 0.7 millimeter.

20. The induction heating cell according to claim 8, wherein the caul has a non-planar shape.

* * * * *